United States Patent [19]

Hester

[11] Patent Number: 4,969,585
[45] Date of Patent: * Nov. 13, 1990

[54] LIQUID DISPENSING APPARATUS

[76] Inventor: Kenneth D. Hester, 10042 Connell, Overland Park, Kans. 66212

[*] Notice: The portion of the term of this patent subsequent to May 9, 2006 has been disclaimed.

[21] Appl. No.: 306,858
[22] Filed: Feb. 7, 1989
[51] Int. Cl.$^5$ ............................................. G01F 11/26
[52] U.S. Cl. .................................... 222/434; 222/442; 222/464; 222/481
[58] Field of Search ................ 222/207, 211, 434, 437, 222/438, 442, 454–457, 464, 478, 481

[56] References Cited

U.S. PATENT DOCUMENTS

| | | |
|---|---|---|
| 143,567 | 10/1873 | Foster . |
| 403,544 | 5/1889 | Maranville . |
| 476,342 | 6/1892 | West . |
| 490,493 | 1/1893 | Olmsted . |
| 987,970 | 3/1911 | Earl . |
| 1,178,512 | 4/1916 | Garlock . |
| 1,270,262 | 6/1918 | Buckland . |
| 1,286,133 | 11/1918 | Snyder . |
| 1,772,903 | 8/1930 | Lawson ............................. 222/434 |
| 1,819,267 | 8/1931 | Raybeck ............................ 222/434 |
| 1,877,808 | 9/1931 | Cagliostro . |
| 2,877,810 | 4/1956 | Zackheim . |
| 2,989,216 | 6/1961 | Moro-Lin . |
| 3,178,081 | 7/1960 | Adams . |
| 3,224,652 | 5/1964 | Ladwig ............................. 222/442 |
| 3,235,133 | 2/1966 | Zimmerman et al. ............... 222/478 |
| 3,255,926 | 6/1966 | Modderno . |
| 4,143,794 | 3/1979 | Stratford et al. ................... 222/207 |
| 4,474,312 | 10/1984 | Donoghue .......................... 222/207 |
| 4,555,046 | 11/1985 | Bennett ............................. 222/478 |
| 4,684,045 | 8/1987 | Su . |
| 4,828,149 | 5/1989 | Hester ............................... 222/464 |

FOREIGN PATENT DOCUMENTS

| | | |
|---|---|---|
| 232104 | 8/1987 | European Pat. Off. ............ 222/207 |
| 2219582 | 4/1972 | Fed. Rep. of Germany . |
| 760765 | 12/1932 | France . |
| 1219473 | 3/1986 | U.S.S.R. ............................ 222/457 |

Primary Examiner—Joseph J. Rolla
Assistant Examiner—Steven M. Reiss
Attorney, Agent, or Firm—Kokjer, Kircher, Bradley, Wharton, Bowman & Johnson

[57] ABSTRACT

A dispensing device for dispensing measured doses of liquid during each dispensing cycle. A fluid-tight bottle is provided with a well at its bottom. A hollow shell fits in the well and includes an opening permitting flow of material from the bottle into the shell. A tubular stem extends from the shell through the top of the bottle and terminates in a dispensing spout. A vent tube exceeds from the interior of the bottle adjacent to the shell and terminates in an upper end located outside of the bottle. The vent tube is apertured inside of the bottle, and a shutter is provided to control the aperture exposure to adjust the level at which the liquid can rise in the shell.

17 Claims, 1 Drawing Sheet

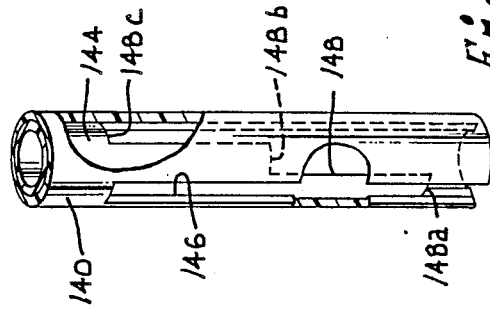
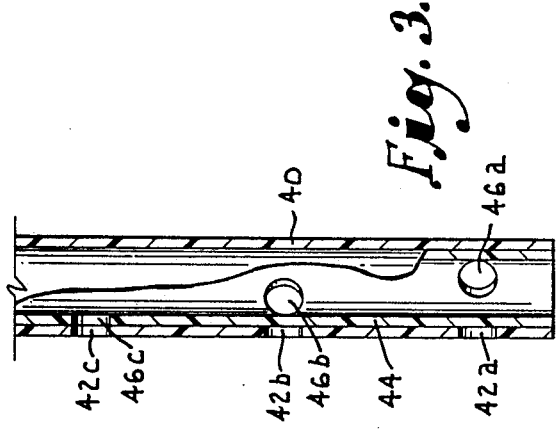
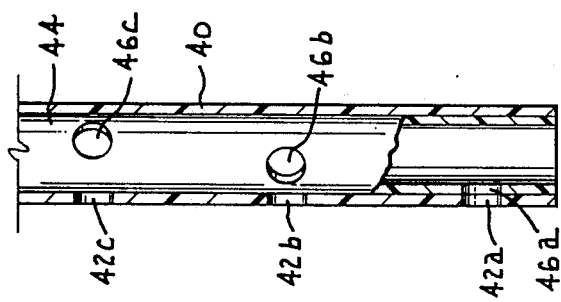
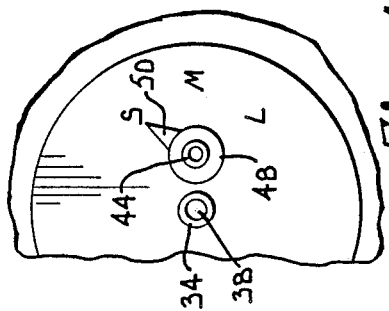
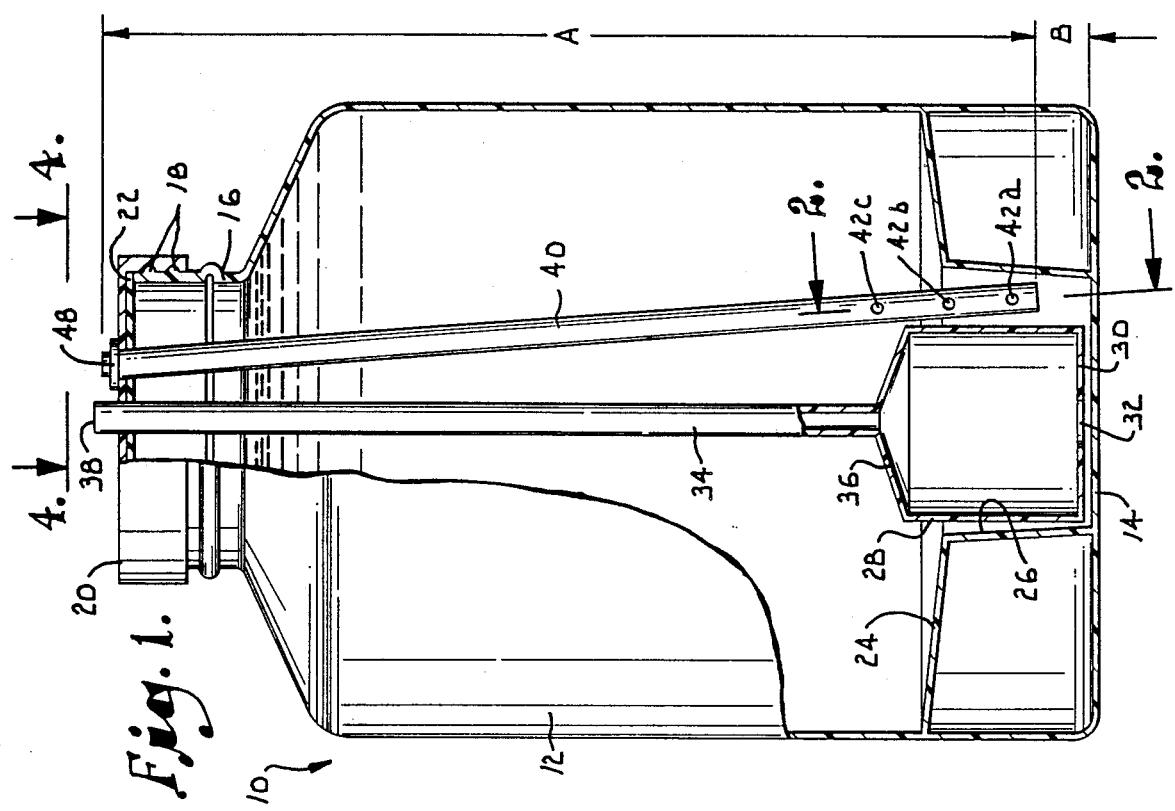

LIQUID DISPENSING APPARATUS

BACKGROUND AND SUMMARY OF THE INVENTION

This invention relates generally to the dispensing of liquids and deals more particularly with a dispensing device that is constructed to dispense liquid in measured amounts.

Liquids such as liquid soap and bleach must be applied in measured doses in order to effectively perform their intended functions. The cap which covers the container of the product is commonly used for measurement purposes. In the case of liquids, the use of the cap to measure the amount of the product to be used can create a considerable mess. In addition, time is consumed in filling the cap to the required level and then pouring out the contents of the cap. It is also common for the doses to vary significantly when this procedure is used. If it is intended for the dosage to be increased or decreased, "eyeballing" is typically employed and considerable inaccuracies can result.

My co-pending application, Ser. No. 090,606 filed on Aug. 28, 1987, now U.S. Pat. No. 4,828,149, discloses various dispensing devices which can accurately dispense consistent doses of liquid. The present invention is directed to yet another dispensing device which uses hydraulic principles to dispense measured doses of liquids.

It is a particularly important feature of the invention that the dispensing device has a simple construction and is devoid of mechanical complexities, thus permitting it to be mass produced at a relatively low cost. In accordance with the invention, a rigid container for liquid has a shell with a bottom opening and a stem which extends from the shell out through the top of the container. A vent conduit extends beside the shell and stem and is apertured to allow air to enter the container. A specially constructed shutter controls the aperture exposure to allow variation in the amount of liquid entering the shell to be dispersed.

DETAILED DESCRIPTION OF THE INVENTION

In the accompanying drawings which form a part of the specification and are to be read in conjunction therewith and in which like reference numerals are used to indicate like parts in the various views:

FIG. 1 is an elevational view of a dispensing device constructed according to a preferred embodiment of the present invention, with portions shown in cross section for purposes of illustration;

FIG. 2 is a fragmentary sectional view on an enlarged scale taken generally along line 2—2 of FIG. 1 in the direction of the arrows with the shutter mechanism set to provide a small dose of liquid;

FIG. 3 is a fragmentary sectional view similar to FIG. 2 but with the shutter mechanism set to provide a large does of liquid;

FIG. 4 is a fragmentary top plan view taken generally along line 4—4 of FIG. 1 in the direction of the arrows; and FIG. 5 is a fragmentary perspective view of a modified dosage control mechanism that may be used in the device of the present invention.

Referring now to the drawing in more detail and initially to FIG. 1, numeral 10 generally designate a dispensing device constructed in accordance with the present invention. The dispensing device 10 includes a rigid container 12 which preferably takes the form of a bottle holding nonpressurized liquid that is to be dispensed. The container 12 may be of virtually any desired shape and size. Container 12 has a flat bottom 14 and tapers near its top portion to provide a beaded neck 16. The top portion is exteriorly threaded at 18. A removable cap 20 is interiorly threaded to mate with the threads 18, thus securing the cap 20 in place on top of the neck 16. A gasket 22 or other means of providing a fluid tight seal between the cap 20 and the upper edge of neck 16 is provided. It is noted that the cap 20 can be removed by threading it off of the neck 16.

Container 12 has a false bottom 24 spaced above bottom 14. An open topped well 26 is formed in the center of the false bottom 24 and extends to the true bottom 14. The false bottom 24 inclines downwardly toward the well 26 in order to direct the liquid contents of the container into the well. The well 26 is generally cylindrical.

A hollow shell 28 is received in the well 26. Shell 28 has a generally cylindrical sidewall and a flat bottom 30 provided with an inlet port 32 at its center. The flat bottom 30 is adjacent to the bottom 14 of the container.

A hollow tubular stem 34 extends upwardly from the shell 28. Stem 34 is much smaller in diameter than shell 28. The shell and stem are connected by a funnel 36 which inclines upwardly from the top edge of shell 28 to the lower edge of stem 34. Stem 34 extends centrally through and is sealed to the cap 20. The top end of stem 34 is located outside of container 12 and is open to provide a dispensing spout 38 from which the contents of the container are dispensed.

A vent tube or conduit 40 is located outside of the stem 34 and shell 28 yet is within the confines of the container 12. The lower end of conduit 40 is open and is located beside the shell 28. Conduit 40 extends through and is sealed to the cap 20. The top end of conduit 40 is open and is located outside the container beside the top end of stem 34. Conduit 40 is provided on its lower portion with three spaced apart apertures 42a, 42b and 42c located one above the other. The apertures are located beside shell 28 and control the amount of liquid that enters the shell, as will be explained more fully.

A shutter which controls the exposure of apertures 42a-42c is formed by a tube 44 which is located within vent tube 40 and extends the full length of tube 40. Tube 44 is slightly smaller in diameter than tube 40, and achieves a snug yet rotatable fit within tube 40. Tube 44 is provided with three apertures 46a, 46b and 46c which are offset both longitudinally and circumferentially. The apertures 46a-46c are located and arranged such that when the smaller tube 44 is rotated within conduit 40, apertures 46a-46c are selectively aligned with the respective apertures 42a-42c.

The top end of tube 44 projects through the cap 20 and is provided with a dial 48 which is accessible to permit the tube 44 to be rotated. A visual indication of the rotative position of tube 44 is provided by a pointer 50 which projects from the dial 50 and is adjacent to the upper surface of cap 20. The top surface of cap 20 is marked with the letters "S", "M", and "L", which indicate small, medium and large doses, respectively, and which the pointer 50 aligns with in different rotative positions of tube 44. Alternatively, the cap may be marked numerically with specific doses to be dispensed indicating exact amounts in cubic centimeters or another volumetric measurement.

When the device is shipped or otherwise handled prior to its initial use, it may be oriented on its side or in a variety of other positions which would allow both the stem 34 and the vent conduit 40 to fill with liquid. Preferably, tube 44 is rotated to a position where all of the apertures 46a–46c are misaligned with apertures 42a–42c. Then the only fluid ingress or egress to or from conduit 40 is provided by its open top and bottom ends.

To dispense an initial dose of liquid from the container 12, the container is inverted. At this time the head pressure applied to stem 34 is equal to the sum of the dimensions A and B, where A is the distance between the top and bottom ends of conduit 40 and B is the distance between the bottom end of conduit 40 and the bottom 30 of shell 28. At the same time, the head pressure applied to tube 40 is equal only to the dimension A. Because the stem receives a larger head pressure, the liquid contained in it begins to exit from the container through the stem thus creating a vacuum which causes the liquid contained in tubes 40 and 44 to be drawn into the container to displace the liquid that is dispensed through the stem. Eventually, all of the liquid in the stem will have been drawn back into the container, and ambient air is thereafter drawn through the tubes 40 and 44 until the entire contents of stem 34 and shell 28 have been emptied. Thus the initial dose that is dispensed includes the liquid contained in the stem 34 as well as that in the shell 28. At the end of the dispensing operation, the bottle is returned to its upright position.

When the bottle is returned to the upright position, air is trapped in tubes 40 and 44 and also in stem 34. Since the lower end of tube 40 is above opening 32 by the distance B, the difference in head pressure results in air entering the bottle from the exterior through tubes 40 and 44. As a consequence, liquid is able to flow into shell 28 through opening 32 until the liquid rises to the level of the lower end of tube 40 (with the apertures 46a–46c all misaligned with the apertures 42a–42c). At this point, an equilibrium state is achieved and the liquid cannot rise above this level in either the stem 34 or the conduit 40 because no air can enter to displace the liquid.

The second dispensing cycle involves inversion of the bottle to permit the liquid that is trapped within shell 28 to be dispensed through stem 34, and the liquid that is dispensed is displaced by air which enters through tubes 40 and 44. Once all of the liquid in shell 28 is dispensed, the dispensing cycle has been completed and the bottle can be returned to its upright position.

Subsequent dispensing operations occur in the same manner. It is pointed out that whereas the initial dispensing dosage includes the liquid contained in shell 28 and that contained in stem 34, the second and all subsequent dispensing doses include only the liquid which is contained in the shell 28. The liquid that enters shell 28 between each dispensing cycle is able to rise only to the level of the bottom end of tube 40, thus providing a consistent dose for dispensing.

The level to which the liquid rises within shell 28 and stem 34 each time the bottle is returned to its upright position is determined by the location of the highest opening in tube 40 which is exposed to or communicates with the interior of the container 12. When none of the apertures 42a–42c are exposed, the shell will fill only to the level of the lower end of tube 40. If any of the corresponding apertures 46a–46c, are aligned with corresponding apertures 42a–42c, the liquid will fill the shell to a level equal to the height of the highest pair of aligned apertures. Aligning two apertures (one on conduit 40 and the other on tube 44) has the same effect as shortening tube 40, thus allowing shell 28 to be filled to a level equal to the height of the uppermost pair of aligned apertures. If more than one set of apertures is aligned, the shell will fill to the level of the highest set of aligned apertures (when the container is in the upright position).

The pointer 50 is located to align with the "S"0 designation when the lower apertures 42a and 46a are aligned (see FIG. 2), with the "M" designation when the intermediate apertures 42b and 46b are aligned, and with the "L" designation when the upper apertures 42c and 46c are aligned. In this manner, the pointer 50 gives a visual indication of the dosage (i.e., small, medium or large). It should be understood that additional apertures can be provided. When all apertures are misaligned, a "minimum" dosage is contained in the shell 28.

A modified form of the invention arranges the tube 44 for sliding movement longitudinally within tube 40 to selectively open or close apertures 42a–42c. Tube 44 can either be devoid of apertures with the location of the lower end of tube 44 serving to selectively expose apertures 42a–42c, or the tube 44 can be provided with apertures situated to align with apertures 42a–42c depending upon the longitudinal position of tube 44 within conduit 40.

It should be noted that the amount of fluid contained within the shell is controlled by the alignment (or lack of alignment) of the apertures when the container is in the upright position and the shell is refilling after the dispensing of the previous dose. If the shell is allowed to fill completely due to alignment of the apertures 42c and 46c and then the apertures become misaligned, the dose dispensed will be the dose contained in the shell. Changing the alignment of the apertures after the shell is filled will not decrease the amount of fluid contained within the shell and therefore will not decrease the amount of the dose dispensed.

If the shell is allowed to refill with none of the apertures aligned, the shell will fill only to a level equal to the lower end of conduit 40. If after the shell is filled the position of tube 44 is changed so as to align some of the apertures, the shell will resume filling and will fill to a level equal to the set of aligned apertures positioned uppermost in the container.

If it is contemplated that the application to which the container is applied will require frequent changing of the selected dose, a mechanism can be supplied to position tube 44 within conduit 40 to preclude the alignment of apertures during refilling until the next desired dose is decided upon and selected. This mechanism can take a variety of forms. Examples of mechanisms suited to this purpose include a handle which would encourage the proper repositioning of tube 44 within conduit 40 before inversion and dispensing of the dose and a spring loaded mechanism which repositions tube 44 appropriately within conduit 40 upon inversion.

FIG. 5 depicts a modified dosage control arrangement which includes an outer vent conduit 140 functioning similarly to conduit 40 and a tube 144 which serves as a shutter in a manner similar to tube 44. Tube 144 fits snugly in and can be rotated in conduit 140. The lower end portion of conduit 140 is provided with a vertical slot 146, the exposure of which is controlled by a stepped edge 148 on tube 144. The stepped edge includes horizontal steps 148a, 148b and 148c which are staggered both longitudinally and circumferentially. When tube 144 is rotated to align the lowest step 148a with slot 146, the slot is exposed only up to the level of step 148a. Similarly, when the intermediate step 148b is aligned with slot 146, the slot is exposed up to the level of step 148b. Step 148c is the highest step and is at the level of the top of the slot, so the entire slot 146 is exposed when the rotative position of tube 144 is such that the step 148c is in alignment with the slot. In this manner, the rotative position of the tube 144 again determines the effective height of the bottom of conduit 140 to control the level (and volume) of liquid in shell 28, thus setting the dosage that is dispensed when the container is inverted. The top end of tube 144 can be provided with the dial 48 and pointer 50 or another visual dosage indication.

It should be noted that the container 12 should not be filled to a level high enough that, upon inversion of the bottle, the lower end of tube 40 or 140 or any aligned or open apertures would be immersed in liquid. If the bottle were filled excessively after the contents of the stem and shell were emptied, fluid would be able to exit through tube 48 until the level of liquid contained in the bottle was coincident with the bottom end of the tube or any aligned apertures of the tube. This would not result in the dispensing of accurate doses.

It is to be noted that it is necessary to allow air ingress to the air chamber above the liquid when the container is upright so that the air is able to displace the liquid that flows into the shell and stem. This air ingress is allowed through the vent conduit 40 or 140. It is also necessary to allow air ingress to the volume above the inverted container during dispensing so that air can displace the liquid that is being dispensed. This air ingress to the bottom part of the container is provided through conduit 40 or 140 which extends from outside the container to the interior of the container to a level equal to the desired level of fill in the shell.

The shell which receives the liquid to be dispensed must open into the container in a manner to encourage filling of the shell with liquid when the container is upright, and the liquid captured in the shell must not be able to escape to any appreciable extent when the container is inverted. A passage way such as the hollow stem must lead from the shell to the exterior of the container to dispense the shell contents, and the orientation of the stem must be such that the entire contents of the shell are dispensed when the container is inverted but liquid is retained in the shell when the container is upright. The stem may be inclined somewhat rather than vertical as shown. The shape of the shell should encourage complete emptying of its contents into the stem, such as by providing the funnel shaped transition 36 from the shell to the smaller stem.

From the foregoing, it will be seen that his invention is one well adapted to attain all the ends and objects herein set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A dispensing device for dispensing liquid in measured amounts, said device comprising:
    a substantially fluid tight container for holding liquid, said container having top and bottom portions and an air chamber in said top portion above the liquid level in the container;
    a hollow shell in the bottom portion of said container, said shell having an opening therein for entry of liquid from the container;
    a hollow stem providing a flow passage extending from said shell through the top portion of the container and terminating in a dispensing spout located outside of the container for dispensing the liquid;
    a vent conduit extending within the container and having an open top end located outside of the container, said vent conduit having aperture means opening into the container adjacent the bottom thereof outside of said shell; and
    shutter means for varying the exposure of said aperture means in a manner to vary the uppermost level at which air can enter the container from the vent conduit, thereby adjusting the dosage volume of liquid that can enter the shell and be dispensed through the said stem when the container is inverted.

2. The device in claim 1, wherein:
    said aperture means comprises a plurality of spaced apart apertures in said vent conduit opening into said container at different levels therein; and
    said shutter means comprises a tube fitted in said vent conduit for movement therein to control which of said apertures are exposed to the interior of the container.

3. The device of claim 2, including indication means associated with said tube for indicating the relative position of the tube in a manner to provide an indication of the volume of liquid that can enter the shell and be dispensed when the container is inverted.

4. The device of claim 2, wherein:
    said tube is mounted for rotation in said vent conduit; and
    said tube includes aperture means which aligns with different apertures in the vent conduit at different rotative positions of the tube.

5. The device of claim 4, including indication means for indicating the rotative position of said tube.

6. The device of claim 1, wherein:
    said aperture means comprises a slot in said vent conduit extending generally up and down; and
    said shutter means comprises a shutter mounted in said vent conduit for movement therein to block different levels of said slot at different positions of the shutter.

7. The device of claim 6, wherein:
    said shutter comprises a tube mounted in said vent conduit for rotation therein; and
    said tube has an edge configuration to expose progressively higher portions of said slot upon progressive rotation of the tube in a pre-selected direction.

8. The device of claim 6, including means for indicating the position of said shutter.

9. The device of claim 1, including indication means for indicating the volume of liquid that can enter the shell and be dispensed when the container is inverted.

10. A device for dispensing liquid in different measure dosages, said device comprising:
- a substantially fluid tight container for holding liquid, said container having top and bottom portions and an air chamber in said top portion above the liquid level in the container;
- a hollow shell in the bottom portion of said container, said shell having an opening therein for entry of liquid from the container;
- a hollow stem providing a flow passage extending from said shell through the top portion of the container and terminating in a dispensing spout located outside of the container for dispensing of the liquid;
- a vent conduit extending within the container at a location outside of said shell, said vent conduit having an open end located outside of the container and a plurality of spaced apart apertures opening into said container adjacent the bottom thereof at different levels; and
- shutter means for controlling which of said apertures are exposed, thereby controlling the level of the liquid in said shell and the volume of the dose that is dispensed through the stem when said container is inverted.

11. The device of claim 10, wherein said shutter means comprises a tube fitted in said vent conduit for rotation and arranged to expose progressively higher apertures upon progressive rotation in a pre-selected direction.

12. The device of claim 11, including means for indicating the rotative position of said tube.

13. The device of claim 10, including means for indicating the uppermost aperture that is exposed to thereby indicate the dose of liquid in the shell.

14. A device for dispensing liquid in adjustable measured doses, said device comprising:
- a substantially fluid tight container for holding liquid, said container having top and bottom portions and an air chamber in said top portion above the liquid level in the container;
- a hollow shell in the bottom portion of said container, said shell having an opening therein for entry of liquid from the container;
- a hollow stem providing a flow passage extending from said shell through the top portion of the container and terminating in a dispensing spout located outside of the container for dispensing of the liquid;
- a vent conduit extending within the container at a location outside of said shell, said vent conduit having an open end located outside of the container and a slot opening inside of the container adjacent the bottom thereof and extending generally up and down therein; and
- adjustable shutter means for controlling the highest level of said slot exposed to the container, thereby controlling the level to which liquid can rise in said shell and the volume of the dose that is dispensed therefrom through the stem upon inversion of the container.

15. The device of claim 14, wherein said shutter means comprises a tube fitted for rotation in said shell and having an edge shaped to expose progressively higher portions of the said slot upon progressive rotation of said tube in a pre-selected direction.

16. The device of claim 15, including means for indicating the rotative position of the tube.

17. The device of claim 14, including means for visually indicating the volume of the dose of liquid in the shell.

* * * * *